United States Patent
Ansley

(10) Patent No.: US 6,576,891 B2
(45) Date of Patent: Jun. 10, 2003

(54) GIMBALED SCANNING SYSTEM AND METHOD

(75) Inventor: David A. Ansley, Long Beach, CA (US)

(73) Assignee: Raytheon Company, Lexington, MA (US)

(*) Notice: Subject to any disclaimer, the term of this patent is extended or adjusted under 35 U.S.C. 154(b) by 50 days.

(21) Appl. No.: 09/785,150

(22) Filed: Feb. 16, 2001

(65) Prior Publication Data
US 2002/0139926 A1 Oct. 3, 2002

(51) Int. Cl.⁷ .................................................. H01J 3/14
(52) U.S. Cl. ........................ 250/234; 359/555; 359/876
(58) Field of Search .................................. 250/234, 235, 250/236, 203.1, 206.2; 359/197–198, 212–221, 554–555, 876, 872; 280/764.1; 352/132; 296/223–224; 396/13, 12, 7

(56) References Cited

U.S. PATENT DOCUMENTS

| | | | | |
|---|---|---|---|---|
| 3,999,832 A | | 12/1976 | Schlesinger | |
| 4,013,885 A | * | 3/1977 | Blitz | 250/203.4 |
| 4,386,848 A | * | 6/1983 | Clendenin et al. | 356/5.01 |
| 4,393,597 A | * | 7/1983 | Picard et al. | 33/275 G |
| 4,491,397 A | * | 1/1985 | Barthelat et al. | 359/557 |
| 4,815,757 A | * | 3/1989 | Hamilton | 280/764.1 |
| 4,883,347 A | * | 11/1989 | Fritzel | 359/555 |
| 5,867,317 A | * | 2/1999 | Elie et al. | 359/555 |
| 6,188,078 B1 | * | 2/2001 | Bell et al. | 250/559.1 |
| 6,201,232 B1 | * | 3/2001 | Carlisle | 250/206.2 |
| 6,370,329 B1 | * | 4/2002 | Teuchert | 396/7 |

* cited by examiner

Primary Examiner—Kevin Pyo
Assistant Examiner—Seung C. Sohn
(74) Attorney, Agent, or Firm—Colin M. Raufer; Leonard A. Alkov; Glenn H. Lenzen, Jr.

(57) ABSTRACT

A scanning system (10) and a method permit scanning a desired field-of-view within a maximized field-of-regard at a constant speed without reversing the scan direction about a primary axis (38). The system includes a mirror (20) which rotates about the primary axis (38). The mirror (20) is supported for rotation about a flip axis (40) which is perpendicular to the primary axis (38). Rotation of the mirror (20) about the primary axis (38) is divided into a scan period during which the field-of-view is scanned by the mirror (20), and a flip period during which the mirror (20) rotates about the flip axis (40). The mirror (20) is mounted in a gimbal for independent rotation about a secondary axis (24) which is parallel to the primary axis (38). Rotation of the mirror (20) about the secondary axis (24) provides an adjustment of the mirror orientation such that at the end of the scan period the mirror (20) faces the end of the field-of-view, and at the end of the flip period the mirror (20) faces the beginning of the field-of-view.

28 Claims, 4 Drawing Sheets

GIMBALED SCANNING SYSTEM AND METHOD

This invention was made with government support under Contract Number DAAB07-98-C-D267 awarded by the U.S. Department of the Army. The government has certain rights in this invention.

FIELD OF THE INVENTION

The present invention relates to a scanning system and method, more particularly to a scanning system and method using a constant velocity scan with a gimbaled reflecting surface.

BACKGROUND OF THE INVENTION

Scanning sensors are used in the modern military for surveillance and scouting. More particularly, scanning sensors are used to survey a desired field-of-view (hereinafter abbreviated as "FOV") (such as a section of the sky) within a generally broader field-of-regard (hereinafter abbreviated as "FOR") (such as the entire sky within sight). A scanning sensor may be mounted on a stationary structure, a light scout vehicle or a ship, for example.

The scanning sensor may be mounted at an elevated position, on a mast, for example, to maximize the available FOR. Changing the scan direction can induce a twisting moment on the mast, which in turn requires a reaction mass to counter the twisting moment, increases the energy requirements and reduces the maximum scanning speed. The twisting moment created by changing the scan direction also requires a stronger, heavier and more expensive mast to reduce the risk of failure.

If the scanning sensor rotates a complete three hundred sixty degrees at either a constant velocity or at an accelerated rate outside the FOV, substantial time is expended outside the FOV. To minimize the time required to scan within the FOV, scanners which reverse their scan direction at the edges of the FOV have been developed. Reversing the scan direction requires the system to rapidly decelerate, stop, reverse direction and accelerate back to the scanning velocity. However, changing direction reduces the maximum FOV which can be scanned by the distances traveled during the deceleration and acceleration periods.

SUMMARY OF THE INVENTION

The present invention provides a scanning system and a method that permit scanning a desired FOR at a constant speed without reversing the scan direction. A scanning system utilizing the present invention can scan a desired FOR with constant scan speed using a gimbaled and articulated reflective surface. Articulating the reflective surface minimizes or eliminates loss of FOR, minimizes or eliminates the need for a reaction mass to counter an excessive twisting moment on the mast, and reduces power consumption because there is no need to decelerate, reverse direction, and accelerate during the scan. Articulating the reflective surface, rather than reversing the scanning direction, also simplifies the system and is expected to lead to increased durability of the system.

In accordance with one aspect of the invention, a system for scanning a field-of-regard includes means for sensing an image, and means for directing an image from the field-of-regard to the means for sensing. The means for directing includes a reflecting surface rotatable about two generally parallel axes.

In accordance with one or more embodiments of the invention, the parallel axes include a central axis and an adjustment axis spaced from the central axis and rotatable about the central axis; the means for sensing includes a sensor package; the reflecting surface is a mirror; the reflecting surface is rotatable about an elevation axis transverse to the adjustment axis; the elevation axis is perpendicular to the adjustment axis; the reflecting surface is rotatable about a flip axis perpendicular to the central axis; and/or the central axis is vertical.

In accordance with one embodiment of the invention, the system may further include a housing having a turret portion rotatable about the central axis and a sight portion mounted to the turret portion and rotatable relative to the turret portion; the reflecting surface mounted on a gimbal within the sight portion; the gimbal including portions that are independently rotatable about the elevation axis and the adjustment axis; and/or the sight portion being rotatable about a flip axis relative to the turret portion.

In accordance with another aspect of the invention, a combination includes a vehicle having a mast and a scanning system having a sensor package, and a mirror rotatable about generally parallel axes to direct an image from a field-of-regard to the sensor package.

In accordance with one or more embodiments of the invention, one of the axes of rotation is substantially aligned with the longitudinal axis of the mast; and/or the other of the axes of rotation is offset from the longitudinal axis of the mast.

In accordance with yet another aspect of the invention, a method for scanning a field-of-regard includes rotating a reflecting surface about two generally parallel axes to direct an image from the field-of-regard to a sensor package for sensing the image.

In accordance with one or more embodiments of the invention, rotating includes rotating about a vertical axis; rotating includes rotating about a central axis and rotating about a generally parallel adjustment axis; rotating about the central axis includes substantially continuously rotating; rotating about the central axis includes rotating at a substantially constant speed; rotating includes rotating about the adjustment axis and rotating at a speed relative to the rotation about the central axis to direct images from a one hundred eighty degree field-of-view to the sensor package; rotating further includes rotating about an elevation axis that is perpendicular to the adjustment axis to provide elevational adjustments; rotating includes indexing the mirror by incrementally rotating the mirror about the elevation axis until the entire field-of-regard has been scanned; rotating includes rotating about the central axis at a rate of sixty degrees per second; rotating includes rotating about the adjustment axis at a rate of about six degrees per second for at least a portion of each revolution about the central axis; rotating includes rotating about the adjustment axis through a range of about fifteen degrees; and/or rotating includes rotating about the adjustment axis at a rate of about thirty degrees per second.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

The present invention provides a scanning system and method that permit scanning a FOR at a constant speed without reversing the scan direction. The scanning system provided by the present invention uses a gimbaled reflective surface rotating about a primary axis at a constant velocity to scan the FOR without reversing the direction of rotation about the primary axis. The gimbaled reflective surface can be articulated about an axis parallel to the primary axis to face the reflective surface toward the FOR for a maximum amount of time during each revolution about the primary axis.

Figure 1:
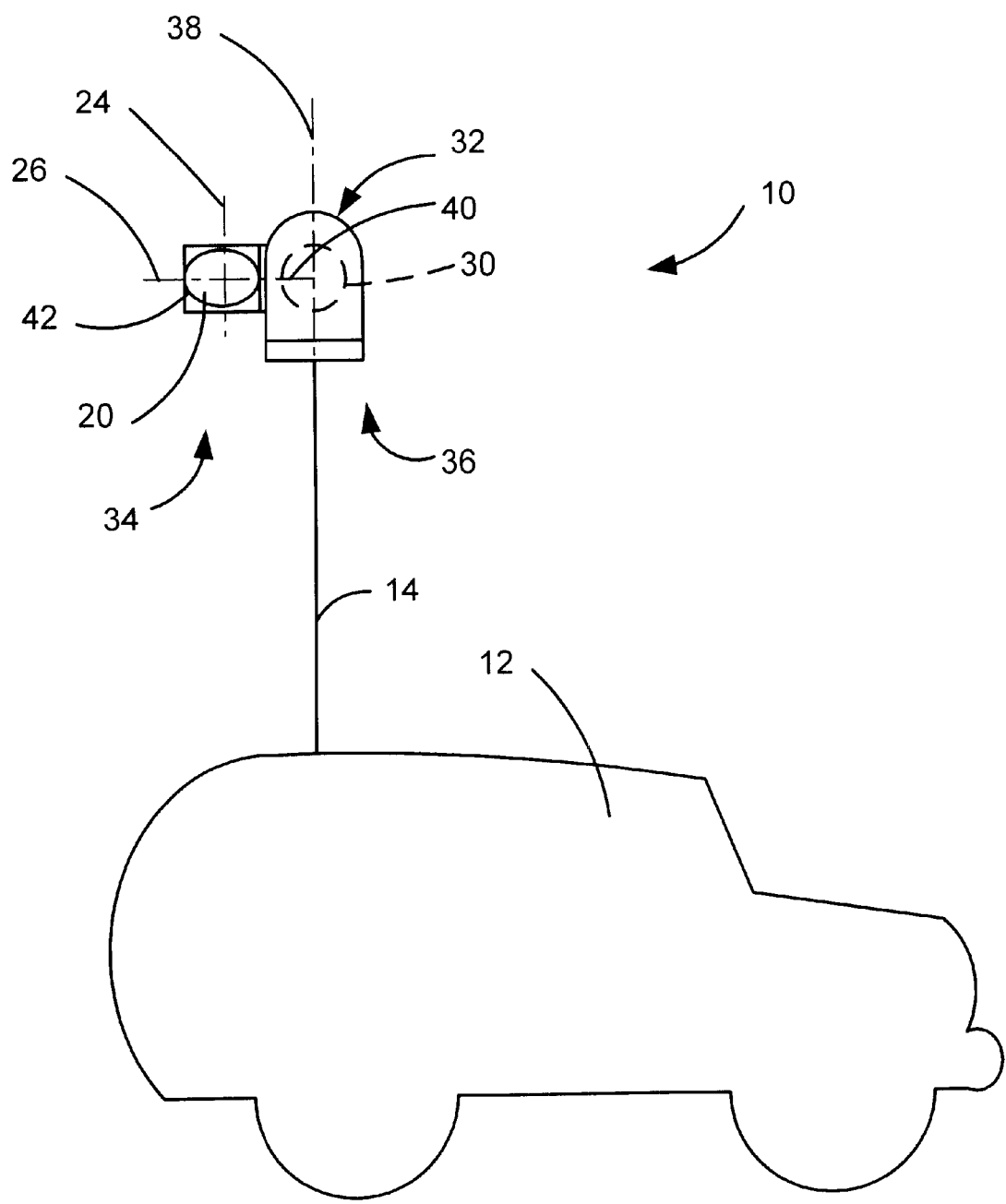
FIG. 1 is an illustrative side view of a scanning system mounted on a mast on a vehicle in accordance with the present invention.
Figure 2:
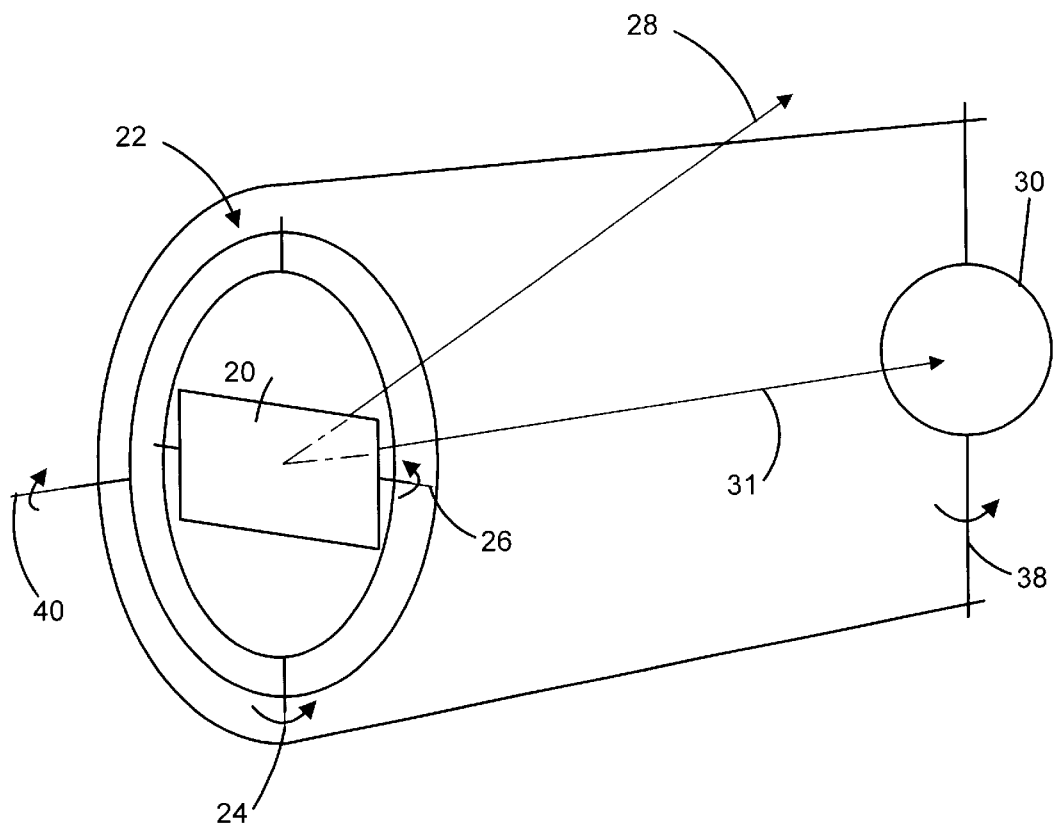
FIG. 2 is a schematic perspective view of the articulated and gimbaled reflective surface of the scanning system illustrated in FIG. 1.

Referring now in detail to the drawings, and initially to FIGS. 1 and 2, an exemplary embodiment of the scanning system 10 is shown in combination with a vehicle 12, having a mast 14 upon which the system is mounted at an elevated position. The vehicle could be a ship, a plane, or a helicopter, and could even be a stationary structure such as a tower or a building. Locating the scanning system at an elevated position generally extends the range of the region to be scanned.

The system 10 includes a reflective surface 20, hereinafter referred to as a mirror, although other devices having a reflective or reflecting surface (such as a prism) may be used. The mirror is mounted in a gimbal 22 for independent rotation about an adjustment axis 24 and an elevation axis 26. The elevation axis is transverse to the adjustment axis, and generally perpendicular to the adjustment axis. From an image lying along a line of sight 28, the mirror directs a reflected image toward a sensor package 30 along a line of reflection 31.

The sensor package 30 includes at least one sensor (not shown) for sensing the reflected image, and may also include a processor (not shown) for analyzing the reflected image. Processors for analyzing images are well known. The sensor package also may include an additional reflective surface 20 for further directing the reflective image from the line of reflection 31.

The system 10 further includes a control assembly (not shown) including components for controllably moving the mirror 20. In the illustrated system, the mirror 20, sensor package 30 and control assembly are mounted within a housing 32. The housing includes a sight portion 34 (also referred to herein as the "sight") that contains the gimbaled mirror 20, and a turret portion or turret 36 that is rotatable about a primary or central axis 38. The mirror is mounted in the sight such that the adjustment axis 24 is substantially parallel to and spaced from the central axis of the turret. The sight is mounted to the turret for rotation about a flip axis 40 that is generally perpendicular to the central axis. The sight also has a window 42 for providing access from images in the FOR to the mirror 20 along the line of sight 28. In the illustrated embodiment, the sensor package is located in the turret near the intersection of the flip axis 40 and the central axis 38. However, one or more components of the sensor package may be located in the sight. Furthermore, one or more components of the control assembly and/or the sensor package may be remotely located. For example, components of the control assembly and/or sensor package may be located within the vehicle 12.

The relative orientation of the various axes is schematically illustrated in FIG. 2. In the illustrated embodiment, the central axis 38 is generally vertical and is offset from and parallel to the adjustment axis 24. The flip axis 40 is perpendicular to the central axis 38 and thus is generally horizontal. The elevation axis 26 is perpendicular to the adjustment axis 24 and thus also generally is horizontal. Although the relative positions of the various axes of rotation generally should be maintained, the orientation of the system 10 may be varied depending on the desired use. Because the gimbal 22 and the mirror 20 are mounted within the sight portion 34 (FIG. 1) of the housing 32, both the gimbal and the mirror rotate about the flip axis with the rotation of the sight 34. In addition, the sight and the gimbaled mirror rotate about the central axis with the rotation of the turret 36 (FIG. 1). The system orients the mirror to reflect an image from the FOR along the line of sight 28. The mirror directs the reflected image along the line of reflection 31 toward the sensor package 30. The line of reflection generally is aligned with or parallel to the flip axis 40.

The operation of the system 10 will be explained with reference to FIG. 4 with assistance from FIGS. 3A–3D. The present invention provides the ability to scan a desired FOR at a constant velocity. In other words, the turret 36 and the sight 34, and thus the gimbaled mirror 20, rotate about the central axis 38 at a constant angular velocity during operation of the system 10, without reversing the direction of rotation about the central axis 38. In the illustrated embodiment this direction is counterclockwise, although it could just as well be clockwise.

In accordance with the present invention, the orientation of the mirror 20 relative to the sight 34 is controllable independent of the rotation about the central axis 38. Referring specifically to FIG. 4, operation of the mirror can be broken down into two phases, with each phase further divided into a scan period and a flip period. During the first scan period 50, the mirror rotates at a constant speed about the adjustment axis 24 and in the same direction as the rotation about the central axis (i.e., counterclockwise in the illustrated embodiment) to scan the desired FOV within the FOR. During the flip period, the sight, and consequently the gimbaled mirror 20, rotates one hundred eighty degrees about the flip axis 40.

During the time the sight 34 is flipping over, the sight continues to rotate about the central axis 38. If no adjustment was made to the orientation of the mirror 20 about the adjustment axis 24 during this time, the mirror would not be facing the edge of the FOV and a portion of the FOV would have passed out of the line of sight 28 by the time the sight completes its flip. For example, if the sight flips in approximately half a second and rotation about the central axis is a constant sixty degrees per second, thirty degrees are lost from the maximum FOR during the flip period.

To maximize the FOR, the mirror 20 is accelerated during the flip period to articulate or rotate the mirror about the adjustment axis 24 through an adjustment angle calculated to face the mirror toward the edge of the FOV at the end of the flip period. The articulation of the mirror through the adjustment angle is a function of the duration of the flip period and the speed and direction of the rotation about the central axis 38. During the first flip period 52, the adjustment angle is positive, i.e., in the counterclockwise direction. The mirror 20 also may be rotatably indexed 54 (raised or lowered, generally in a stepwise fashion) about the elevation axis 26 during the flip period prior to the next pass through the FOV. The mirror may be simultaneously articulated, indexed and flipped. Alternatively, these steps may occur sequentially such that at the conclusion of these steps the mirror is oriented to scan the entire FOV. In addition, it may be practical to flip the mirror one hundred eighty degrees plus/minus the elevation angle and thereby obviate the need for indexed rotation about the elevation axis.

In the second phase, the second scan period 56 is substantially identical to the first scan period 50. As in the first flip period 52, the adjustment angle in the second flip period 60 is a function of the duration of the flip period and the speed and direction of the rotation about the central axis 38. However, during the second flip period 60, the mirror 20 is rotated about the adjustment axis 24 through a negative adjustment angle. To rotate the mirror to the desired negative adjustment angle, the mirror is accelerated through an angle of three hundred sixty degrees less the adjustment angle. Alternatively, rotation of the mirror about the adjustment axis may be stopped and reversed to move the mirror through the negative adjustment angle. Reversing the direction of rotation of the mirror about the adjustment axis creates a smaller moment than reversing the greater mass of the housing 32 and gimbaled mirror 20 rotating about the central axis 38 together.

At the end of the second phase, the mirror 20 again may be rotatably indexed 62 about the elevation axis 26 to the next elevation angle prior to repeating the first phase. In summary, the system 10 provided by the present invention can continuously scan a desired FOV within a maximized FOR at a constant velocity, interrupted only by the time required to flip the mirror 20 about the flip axis 40.

A specific example of the operation of the system 10 will be described with reference to FIGS. 3A–3D. As used in reference to FIGS. 3A–3D, the term "vertical" is used in reference to the drawing on the page for purposes of description only and does not require a particular orientation of the system in actual use. For purposes of this example, the turret 36 rotates about the central axis 38 counterclockwise at a rate of sixty degrees per second. The sight 34 flips one hundred eighty degrees in half of a second, and the mirror 20 and the sight rotate about the central axis through approximately thirty degrees during the flip period. During the scan period, the mirror rotates about the adjustment axis 24 at about six degrees per second. The mirror rotates about the adjustment axis and the central axis in the same direction, providing a scan velocity of seventy-two degrees per second. Naturally, other velocities and fields-of-view may be selected in accordance with the present invention.

Depending on the size of the FOV selected within the FOR, scanning may be completed by between approximately two to approximately eight horizontal sweeps, also referred to as scans or bars, through the FOV. The mirror 20 is elevated to a new elevation angle by indexing the mirror about the elevation axis 26 between bars.

Figure 3A:
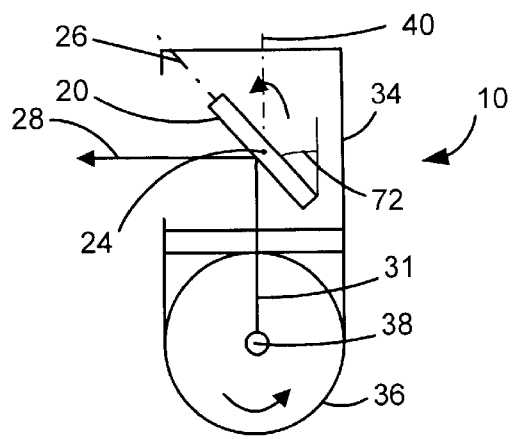
FIGS. 3A–3D are schematic top views of the scanning system illustrating the orientation of the reflective surface at various points while scanning a 180° field-of-view.

FIGS. 3A–3D represent top views of various orientations of the system 10 as it scans a one hundred eighty degree FOV centered toward the top of the page. In FIG. 3A the system has reached the end of a second phase scan and is looking ninety degrees (from a vertical) toward the left (i.e., the line of sight 28 extends to the left from the mirror 20). The mirror and a vertical form a mirror angle 72 of about forty-five degrees. In order to see ninety degrees to the right to begin the next (first phase) scan, the mirror must be articulated through a negative fifteen degree adjustment angle about the adjustment axis 24 during the flip period.

Figure 3B:
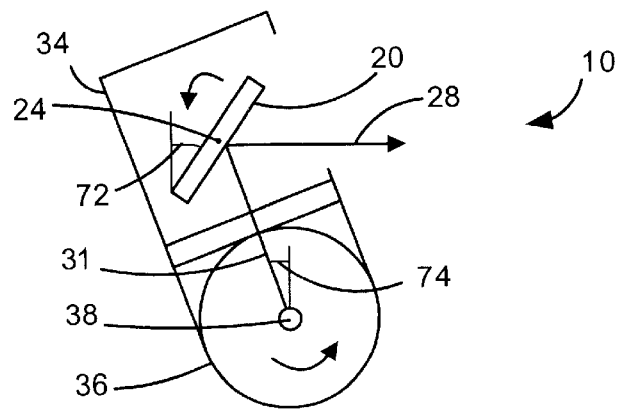
Figure 4:
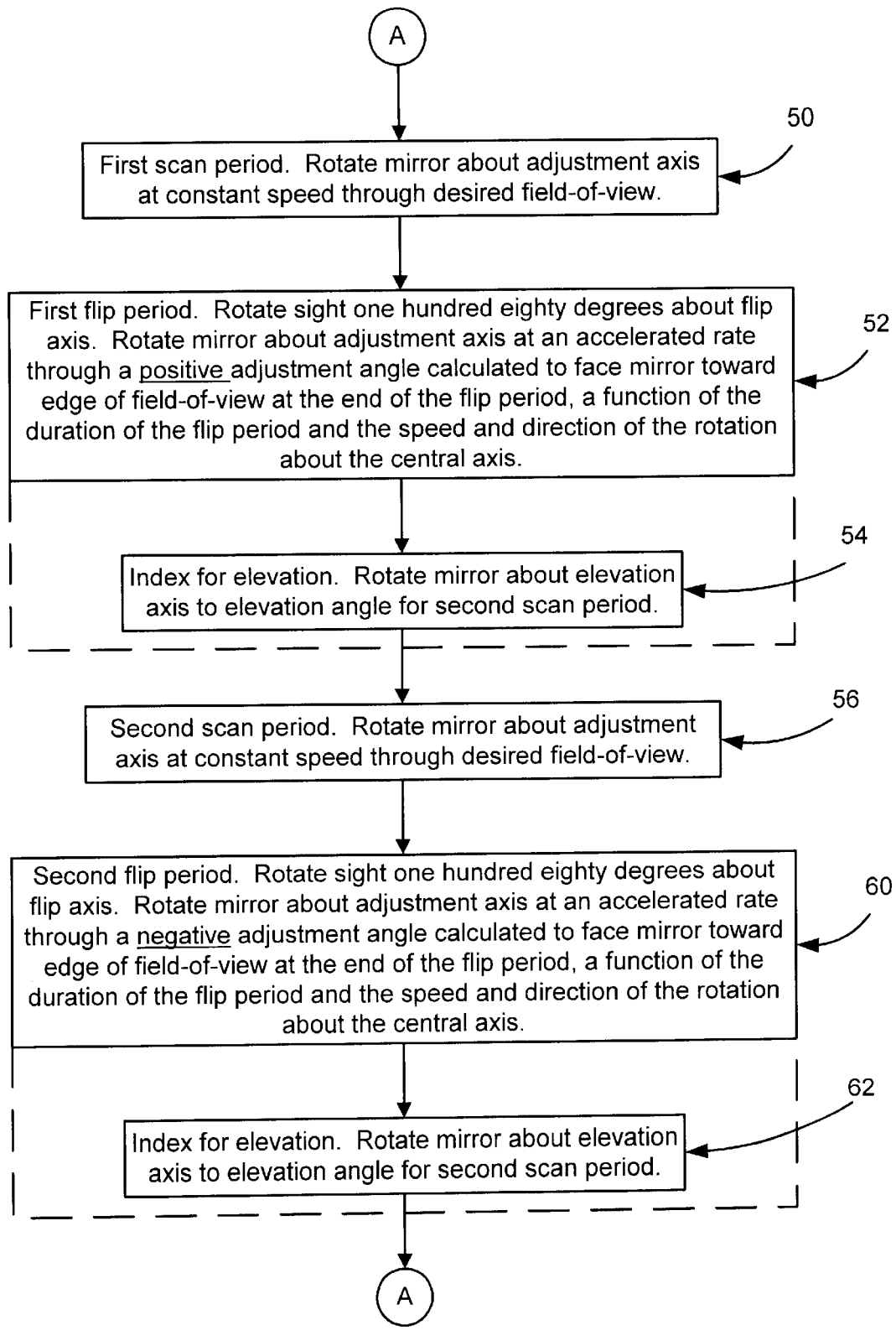
FIG. 4 is a flow chart illustrating an exemplary method of using an articulated gimbaled reflective surface in accordance with the present invention.

As shown in FIG. 3B, when the first scanning period begins, the line of reflection 31 from the mirror 20 to the central axis 38 and a vertical line form a turret angle 74 of thirty degrees. The mirror angle 72 between the mirror and a vertical is sixty degrees. During the scanning period, the mirror rotates at a constant speed of six degrees per second and rotates about the adjustment axis 24 in the same direction (counterclockwise) as the rotation about the central axis. Consequently, the system scans the FOV at a rate of seventy-two degrees per second.

Figure 3C:
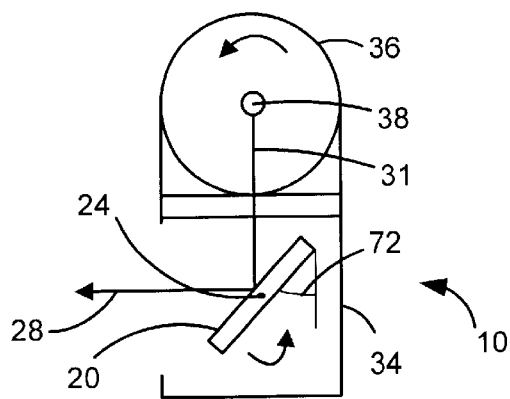
Figure 3D:
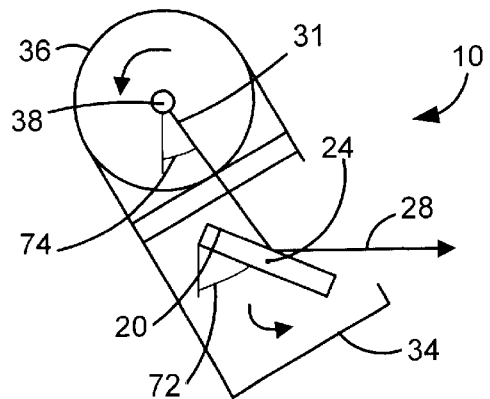

Once the system 10 has scanned the entire FOV, the mirror 20 again faces ninety degrees to the left as shown in FIG. 3C. At this time, the mirror angle 72 is forty-five degrees, and in order to face ninety degrees to the right at the end of the flip period, the mirror 20 must be articulated through a positive adjustment angle of fifteen degrees. At the beginning of the second phase scan shown in FIG. 3D, the line of sight 28 extends to the right from the mirror 20, which is at a mirror angle 72 of sixty degrees relative to a vertical. At this time the line of reflection 31 and a vertical form a turret angle 74 of thirty degrees relative to a vertical. The process is repeated until the entire FOV has been scanned. The entire process may be repeated for continuous scanning of the FOV.

As can be understood from the above description and attached Figures, the present invention provides a scanning system and a method that permit scanning a desired FOR at a constant speed without reversing the scan direction. Articulating the reflective surface minimizes or eliminates any loss of FOR during the time spent flipping the mirror about the flip axis and permits a larger maximum FOR. Articulating the reflective surface rather than reversing the scan direction simplifies the system and thus likely enhances system durability.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

What is claimed is:

1. A system for scanning at least a portion of a field-of-regard, comprising:

means for sensing an image, and means for directing the image from the field-of-regard to the means for sensing, the means for directing including a reflecting surface that is rotatable about a central axis, an adjustment axis in a plane parallel to the central axis, an elevation axis transverse to the adjustment axis and a flip axis perpendicular to the central axis.

2. A system as set forth in claim 1, wherein the elevation axis is perpendicular to the adjustment axis.

3. A system as set forth in claim 1, wherein the means for sensing includes a sensor package.

4. A system as set forth in claim 1, wherein the reflecting surface is a mirror.

5. A system as set forth in claim 1, further comprising a support structure for supporting the reflecting surface at an elevated position.

6. A system as set forth in claim 5, wherein the support structure includes a vehicle having a mast and the reflecting surface is mounted at an elevated position with the central axis generally extending along the mast.

7. A system as set forth in claim 1, wherein the reflecting surface rotates in a constant direction about the central axis.

8. A system as set forth in claim 1, further comprising a housing having a turret portion through which the central axis passes that rotates about the central axis and a sight portion mounted to the turret portion that is selectively rotatable relative to the turret portion about the flip axis.

9. A system as set forth in claim 8, wherein the reflecting surface is mounted on a gimbal that extends within the sight portion.

10. A system as set forth in claim 9, wherein the gimbal includes portions that are independently and selectively rotatable about an elevation axis and an adjustment axis that is perpendicular to the elevation axis.

11. A combination comprising a vehicle having a mast; a housing mounted to the mast; and a scanning system including both a sensor package and a reflecting surface that directs an image from at least a portion of a field-of-regard to the sensor package, wherein the housing includes a turret portion that rotates about a primary axis that passes through the turret portion and a sight portion connected to the turret portion for selective rotation about a flip axis in a plane that is perpendicular to the primary axis, and the reflecting surface is mounted in the sight portion of the housing, the reflecting surface being independently rotatable about an adjustment axis in a plane parallel to the primary axis and an elevation axis transverse to the adjustment axis.

12. A combination as set forth in claim 11, wherein the primary axis is substantially aligned with a longitudinal axis of the mast.

13. A system for scanning at least a portion of a field-of-regard, comprising a housing, a sensor package, and a reflecting surface contained in the housing for directing an image from the field-of-regard to the sensor package, at least a portion of the housing being rotatable about a central axis that passes through the housing, the reflecting surface being rotatable about the central axis, an adjustment axis that passes through the housing and is in a plane that is parallel to the central axis, a flip axis that is perpendicular to the central axis, and an elevation axis that is perpendicular to the adjustment axis.

14. A system as set forth in claim 13, wherein the housing includes a turret portion through which the central axis passes, and a sight portion containing the reflecting surface and through which the adjustment axis passes.

15. A system as set forth in claim 14, wherein the sight portion is selectively rotatable about the flip axis.

16. A method for scanning at least a portion of a field-of-regard, comprising:

providing a scanning system that includes a sensor package, a housing having a turret portion that rotates about a central axis which passes through the turret portion and a sight portion mounted to the turret portion that is selectively rotatable relative to the turret portion about a flip axis in a plane that is perpendicular to the central axis, and a reflecting surface mounted in the sight portion to direct an image from the field-of-regard to the sensor package, the reflecting surface being rotatable about an adjustment axis that lies in a plane that is parallel to the central axis and an elevation axis that is perpendicular to the adjustment axis;

continuously rotating the housing about the central axis;

selectively rotating the sight portion of the housing about the flip axis during at least a portion of each revolution about the central axis; and selectively rotating the reflecting surface about the adjustment axis and the elevation axis.

17. A method as set forth in claim 16, wherein rotating about the adjustment axis includes rotating at a rate of about thirty degrees per second.

18. A method as set forth in claim 16, further comprising rotating the sight portion of the housing about the flip axis approximately one hundred and eighty degrees during each revolution about the central axis.

19. A method as set forth in claim 16, wherein providing the scanning system includes mounting the reflecting surface on a gimbal that is mounted for rotation with the sight portion of the housing, the gimbal providing independent rotation of the reflecting surface about the adjustment axis and the elevation axis.

20. A method as set forth in claim 16, wherein rotating about the central axis includes rotating at a substantially constant speed.

21. A method as set forth in claim 16, wherein rotating about the adjustment axis includes rotating at a speed relative to the rotation about the central axis to direct images from a one hundred eighty degree field-of-view to the sensor package.

22. A method as set forth in claim 16, wherein rotating about the adjustment axis includes rotating at a rate of about six degrees per second for at least a portion of each revolution about the central axis.

23. A method as set forth in claim 16, wherein rotating about the elevation axis includes indexing the reflecting surface by incrementally rotating the reflecting surface about the elevation axis.

24. A method as set forth in claim 16, wherein rotating about the central axis includes rotating at a rate of about sixty degrees per second.

25. A method for scanning at least a portion of a field-of-regard, comprising:

providing a scanning system that includes a sensor package, a housing having a turret portion that rotates about a central axis which passes through the turret portion and a sight portion mounted to the turret portion that is selectively rotatable relative to the turret portion about a flip axis in a plane that is perpendicular to the central axis, and a reflecting surface mounted in the sight portion to direct an image from the field-of-regard to the sensor package;

continuously rotating the housing about the central axis; and selectively rotating the sight portion of the housing about the flip axis during at least a portion of each revolution about the central axis, wherein rotating about the central axis and rotating about the flip axis includes sequentially and repeatedly scanning through a first phase and a second phase, the first phase including a first scan period including rotating the reflecting surface about the adjustment axis at a constant first speed through a desired field-of-view, a first flip period including rotating the sight portion of the housing about the flip axis through approximately one hundred eighty degrees while rotating the reflecting surface about the adjustment axis at a second speed greater than the first speed through a positive adjustment angle to face the reflecting surface toward a starting edge of the field-of-view at the end of the first flip period, and the second phase including a second scan period including rotating the reflecting surface about the adjustment axis at a constant first speed through a desired field-of-view, a second flip period including rotating the sight portion of the housing about the flip axis through approximately one hundred eighty degrees while rotating the reflecting surface about the adjustment axis at a second speed greater than the first speed through a negative adjustment angle to face the reflecting surface toward a starting edge of the field-of-view at the end of the second flip period.

26. A method as set forth in claim 25, further comprising determining either the positive adjustment angle or the negative adjustment angle as a function of the duration of either the first flip period or the second flip period, respectively, the desired field of view and the speed and the direction of rotation about the central axis.

27. A method as set forth in claim 25, wherein scanning through the first phase and the second phase includes indexing the reflecting surface for elevation by rotating the reflecting surface about the elevation axis during at least one of the first and second phases.

28. A method as set forth in claim 25, wherein the method includes at least one of rotating about the central axis at a rate of about sixty degrees per second, rotating about the flip axis about one hundred eighty degrees in about half a second, rotating about the adjustment axis at a first speed of about six degrees per second, and rotating about the adjustment axis at a second speed of about thirty degrees per second.

* * * * *